Dec. 4, 1951 C. J. MUELLER 2,577,429
EXTRACTION APPARATUS
Filed Nov. 23, 1945 5 Sheets-Sheet 1

INVENTOR.
Camillo J. Mueller
BY
PATENT AGENT

INVENTOR.
Camillo J. Mueller

Dec. 4, 1951          C. J. MUELLER          2,577,429

EXTRACTION APPARATUS

Filed Nov. 23, 1945          5 Sheets-Sheet 3

INVENTOR.
Camillo J. Mueller
BY

PATENT AGENT

Dec. 4, 1951    C. J. MUELLER    2,577,429
EXTRACTION APPARATUS
Filed Nov. 23, 1945    5 Sheets-Sheet 4

INVENTOR.
Camillo J Mueller
BY
PATENT AGENT

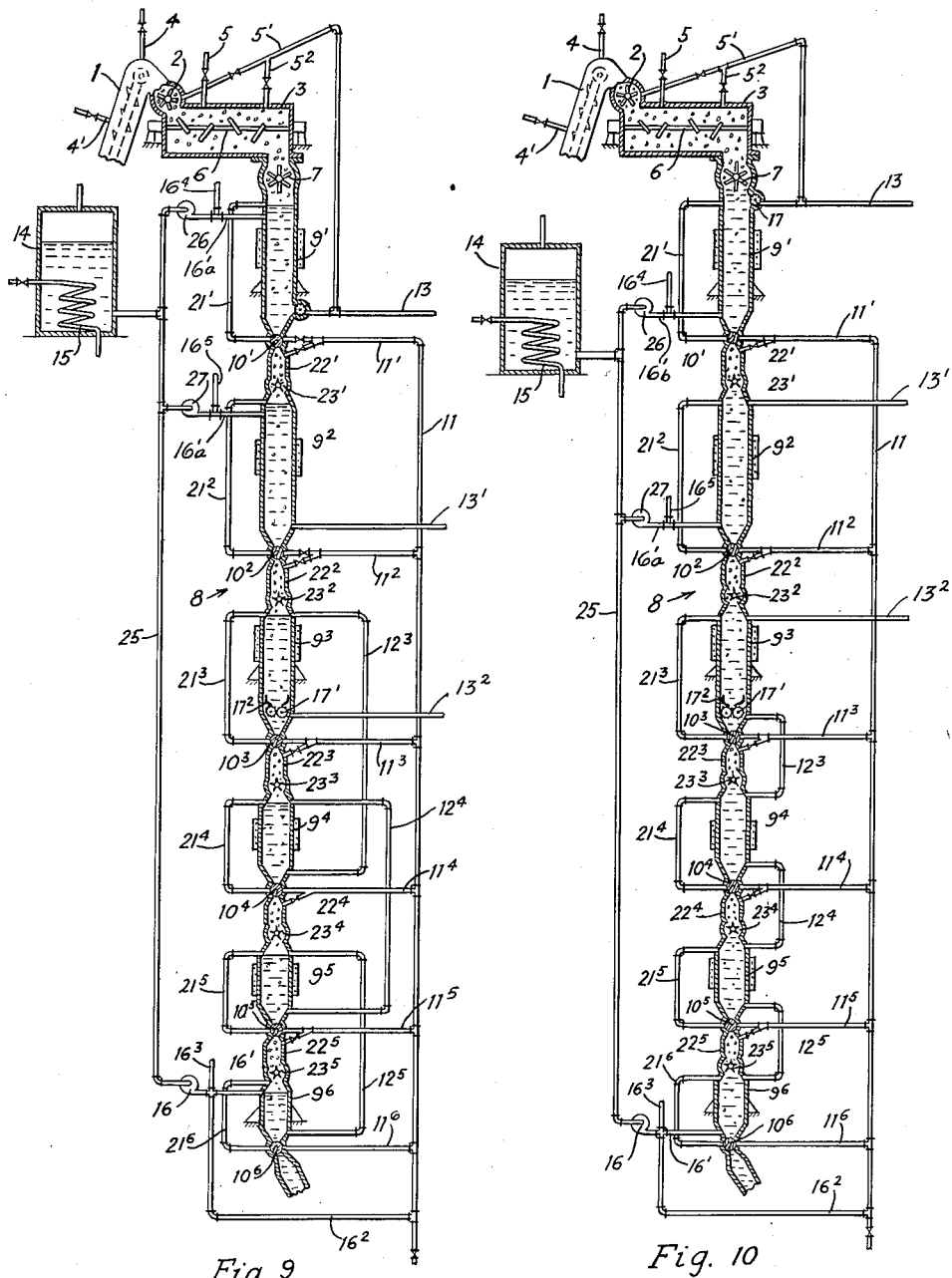

Patented Dec. 4, 1951

2,577,429

UNITED STATES PATENT OFFICE 2,577,429

EXTRACTION APPARATUS

Camillo J. Mueller, New York, N. Y.

Application November 23, 1945, Serial No. 630,462

5 Claims. (Cl. 23—270)

The present invention relates to an apparatus for extracting glue and/or gelatin out of animal by-products as bones, skin, tendons, sinews or waste as parts of the bodies of animals, as well as for extracting sugar or sirup of sugar beet, cane, corn, etc.

This application is a continuation in part of the patent application Ser. No. 433,252, filed March 4, 1942, now Patent No. 2,397,973.

All these products, as glue, gelatin, sugar, and tankage differ somewhat in the manufacturing process, namely substantially in the initial treatment of the raw materials, but the main process of removing the glue, gelatin, sugar or the like from the properly pretreated raw materials is essentially the same hydrolysis and/or diffusion process.

It has been known to extract glue from bones or parts of bodies of animals in autoclaves, where the material to be treated was alternately subjected to steam pressure and hot water, to hydrolize the organic substances, ossein and collagen, and melt the fat and lixiviate these hydrolized substances and melted fat. In order to assure convenient yield this process had to be repeated several times. Other means for extraction were batteries of boilers comprising four or more separate boilers, where the pretreated, crushed or chopped and degreased material was subjected alternately and repeatedly up to 15 times to steam pressure and hot water, the latter being transformed into the solution liquid which becomes more concentrated from boiler to boiler. The extraction of glue and/or gelatine from degreased and demineralized bones (ossein), sinews, tendons and hide glue or gelatin stock (collagen) was also performed in batteries of open or closed tanks. The extraction of sugar was performed in batteries of boilers as used in the connection with the extraction (lixiviation) of blue from bones.

The essential factors in the process are the temperature, duration and hydrogen-ion concentration (pH) which factors determine the yield and quality of the final product. However, it was necessary for efficiency reasons to use large boilers, tanks, or the like and consequently large sized, crushed, chopped or cut raw material. Due to the intermittent operation each tank had to be disconnected, emptied, cleaned and finally refilled.

The known, previously used, and large apparatus necessarily brought about "stiff" methods, performed in accordance with predetermined schedules which did not allow any changes or accommodation and therefore no elasticity concerning duration, temperature and hydrogen-ion concentration (pH) used in the particular process during the operation. Therefore, the known apparatus had inherently a great number of drawbacks resulting in comparatively low quality and yield output, high production cost, large investments, as well as large building and floor space.

The most important object of the present invention is to provide means for treating continuously small quantities of the raw material in the time unit and to expose the raw material to the optimum heat influence for a minimum of time.

Another object of the present invention is to provide an apparatus which allows "elasticity" in the operation that means accommodation of the process during the operation to predetermined conditions as far as temperature, duration and hydrogen-ion concentration (pH) is concerned.

A further object of the present invention is to provide means which allow the yield of different grades of the final product.

A still other object of the present invention is to provide extraction means which allow the use of pulverized or split up material thereby providing a considerably larger surface for action on the material and also speeding up the hydrolysis and lixiviation of the material.

Another object of the invention is to provide an apparatus which reduces the manufacturing cost for at least 30% compared with the manufacturing cost of known devices because of its labor and fuel saving characteristics and lessened need for supervision.

Still a further object of the present invention is to provide an apparatus which allows a larger output compared with the yield of any known apparatus, together with a remarkable improvement in the quality of the final product, and also considerable reduction of time necessary for the entire extraction or diffusion process.

Yet another object of the present invention is to provide means for moving the raw material continuously or intermittently through a plurality of containers and the extraction liquid in counter-current to the movement of the raw material, whereby the said liquid moves within the container either in direction of the flow of the raw material, however, from container to container in opposite direction to the flow of the raw material or within the containers, as well as, from container to container counter to the direction of the movement of the raw material.

It is yet still and another object of the present invention to provide means for controlling the speed of the movement of the raw material.

It is yet a further object of the present invention to provide means for controlling the flow of the liquid.

It is still a further object of the present invention to provide means for controlling of the hydrogen-ion concentration (pH) value of the hot water.

With these and other objects in view which will become apparent in the following detailed description, the present invention will be clearly understood in connection with the accompanying drawings, in which:

Figs. 9 and 10 show sectional views of a variation of the embodiments shown in Figs. 5 and 6, respectively;

The apparatus for manufacturing glue or gelatin from raw bones or degreased and demineralized bones, hide, glue and gelatin stock, tendons, sinews and parts of animal bodies, or for manufacturing of sugar, sugar cane, sugar beet, corn, etc., comprises a plurality of containers connected in series, whereby preferably each container in the series is of larger size than the following one and of smaller size than the previous one.

Figure 1:
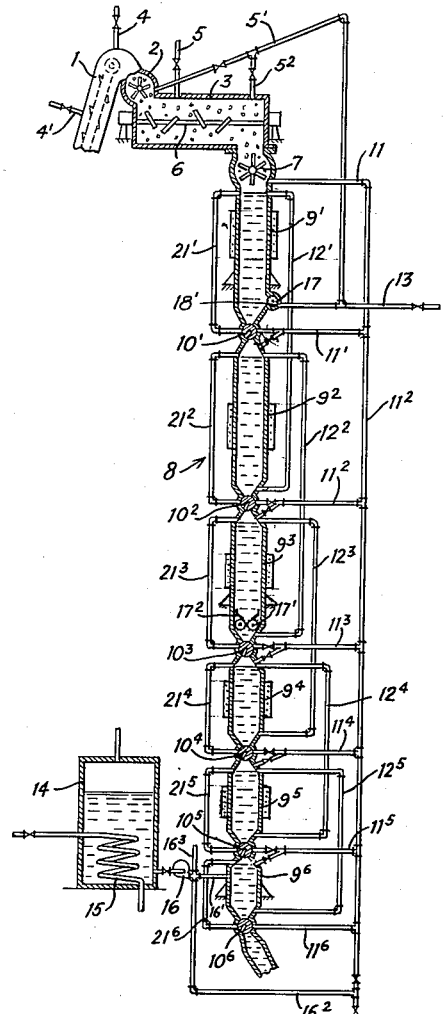
Figure 1 shows a sectional elevation of the apparatus disclosing one embodiment with a conduit performing one type of process.
Figure 2:
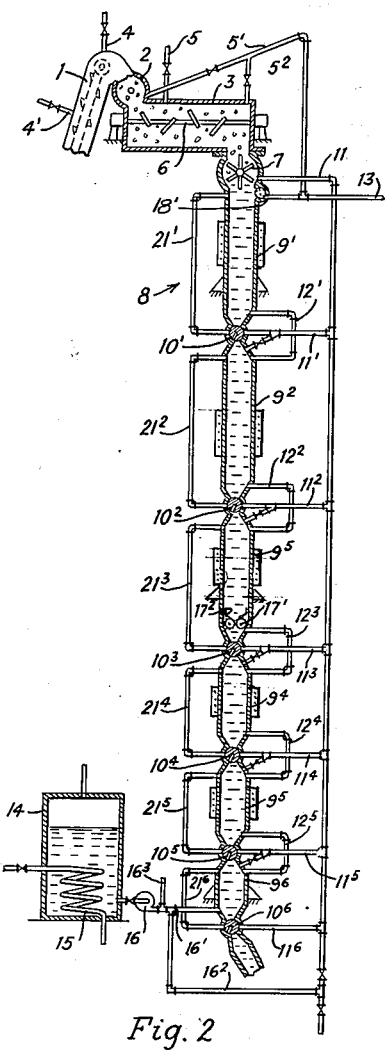
Fig. 2 shows a sectional elevation of the apparatus disclosing the same embodiment, as shown in Fig. 1, having another conduit performing another type of process.

Referring now to the drawings and in particular to the embodiment shown in Figs. 1 and 2, which is given by example only, the raw material, as above mentioned, is conveyed by an elevator 1 through a sluice 2 to a smaller container 3 and treated in the elevator 1 with water through a pipe 4 before entering the container 3. Preferably the material is subjected also in the elevator to a vacuum by means of the pipe 4' in order to remove air which might be contained in the material.

In the small container 3 the preheating and/or the first hydrolysis, that means the first heating of the material by means of live steam or by means of steam jacket or by any other convenient means, takes place by treatment of the crushed, chopped or split up raw material with steam through a pipe 5. In this way the raw material is partly heated and/or hydrolized and now partly solvable in hot water. In case the air has not been removed from the material in the elevator 1 by means of the vacuum pipe 4', vacuum pipes 5' and 5² connected with the sluice 2 and the container 3, respectively, assure removal of the air before being subjected to the main process. A feeding device 6 moves the material from the container 3 through a sluice 7 to the diffusion device 8.

The diffusion device 8 consists of a number of progressively smaller containers $9'$, $9^2$, $9^3$, $9^4$, $9^5$, and $9^6$ which number will depend partly on the histological properties of the raw material and also partly on the degree of the solution to be achieved. The diminution of the volume of the said containers is adapted to the shrinking of the raw material by the extraction process. The entire unit of all containers $9'$ to $9^6$ is under pressure, which pressure declines from the last container $9^6$ to the first container $9'$ and hot water serving as extraction liquid moves in counter current to the movement of the raw material from the last container $9^6$ to the first container $9'$. In order to maintain the liquid at a predetermined temperature each container $9'$ to $9^6$ can be equipped with a steam jacket, as shown in the drawing. However, whereas in the arrangement shown in Fig. 1 the hot water moves in the direction of the movement of the raw material within each container, in the arrangement shown in Fig. 2 the hot water moves counter to the direction of the movement of the raw material within each container. Valve devices $10'$, $10^2$, $10^3$, $10^4$, $10^5$, and $10^6$ are provided between adjacent containers $9'$, $9^2$, $9^3$, $9^4$, $9^5$, and $9^6$. A steam pipe 11 introduces steam through branch pipes $11'$, $11^2$, $11^3$, $11^4$, $11^5$, and $11^6$ which enter the said containers above the liquid levels in the arrangement shown in Fig. 1 and near the top of each container into the liquid in the arrangement shown in Fig. 2, as well as in both cases into the valve devices $10'$, $10^2$, $10^3$, $10^4$, $10^5$, and $10^6$. The pressure is, as stated before, diminishing from the last container $9^6$ up to the first container $9'$ by proper means and is also adapted to the height of the respective containers in order to assure the continuous stream of the liquid from the last container $9^6$ to its associated container $9^5$, through the pipe $12^5$, from the container $9^5$ to container $9^4$ through the pipe $12^4$, and so forth, until the liquid flows under pressure continuously from container $9^2$ to container $9'$ through pipe $12'$. The solution moves then through the pipe 13 preferably to an evaporator (not shown). The balance in the pressure from the last container to the first container is supported by the vacuum prevailing in the evaporator. The whole container unit can, of course, be exposed to a vacuum, as long as the necessary pressure difference is maintained to assure a continuous liquid flow. For particular material as ossein, hide glue and gelatin stock, it is even preferred to perform the entire process under vacuum because lower corresponding temperatures can be used, and higher quality of the final product is obtained. Whereas according to the arrangement shown in Fig. 1 the pipes $12'$, $12^2$, $12^3$, $12^4$, and $12^5$ connect the bottom of the lower container with the top of the next adjacent upper container in accordance with the arrangement shown in Fig. 2, the pipes $12'$, $12^2$, $12^3$, $12^4$ and $12^5$ connect the top of the lower container with the bottom of the next adjacent upper container. Hot water is introduced into the last container $9^6$ from a vessel 14 with a heating coil 15 or any other heating means for the water by means of a pump 16, or pressure or suction of the connected evaportor. The pipe 16' connecting the pump 16 with the lowest container 9⁶ is connected through a conduit 16² with the steam pipe 11. Another conduit 16³ is provided in the pipe 16 to allow change of the hydrogen-ion concentration (pH) of the water to be introduced in the lowest container 9⁶.

Figures 15, 16:
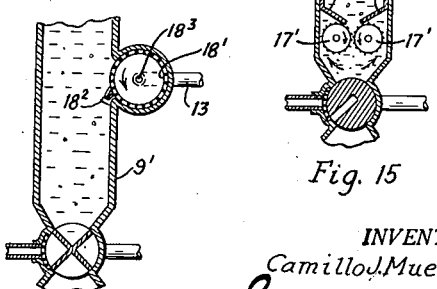
Figs. 15 and 16 are further details of the apparatus.

In order to provide a greater surface of the material to be treated grinding rollers 17' (Fig. 15) may be provided in one or more containers, preferably only in the third container 9³ which is equipped with guide plates 17² for proper operation.

The uppermost container 9' is connected with the pipe 13 as stated above. In order to avoid that the raw material enters the pipe 18' (Fig. 16), the solution flows through a rotating sieve drum 13'; from which the material is taken off by a brush 18² attached to the inside of the container 9'. A hollow shaft 18³ serves as exit for the solution which shaft 18³ extends to the pipe 13.

In accordance with the arrangement shown in Fig. 1 each one of the containers is only partly filled with liquid though entirely filled with cracked or even pulverized raw material and thus contains a gas space and a liquid space. The raw material moves continuously from the first container 9' through all associated containers 9², 9³, 9⁴, and 9⁵ until it reaches container 9⁶ and is then moved preferably to a desiccator (not shown). Thus the raw material is forced to move first into the gas space of the first container 9' exposed there to steam hydrolysis until it reaches the liquid space of container 9'. A rotating valve device 10' moves the raw material into the next adjacent container 9², the material reaching the gas space of the container 9² first to enter the liquid space (diffusion space) of the same container 9² afterwards. This process continues through all containers by means of the rotating valves until the raw material moves through gas space and liquid space of the container 9⁶. The raw material is thus exposed to the hydrolysis process changing to the extraction process in each one of said containers.

In accordance with the arrangement shown in Fig. 2, however, the containers 9', 9², 9³, 9⁴, 9⁵ and 9⁶ are filled entirely with liquid and throughout all containers merely an extraction process takes place. In this arrangement preferably pulverized or split up material of histological solid or tough structure is used and the hydrolysis takes place mainly in chambers of the valves connecting the containers. In the case, however, material of histological soft structure, as ossein, hide, glue and gelatin stock is used, the hydrolysis and diffusion process takes place at the same time throughout all containers 9', 9², 9³, 9⁴, 9⁵ and 9⁶. Though the method performed in the arrangement shown in Fig. 2 differs somewhat from that performed in the arrangement shown in Fig. 1, the apparatus is practically the same with minor changes concerning the conduits 12' to 12⁵ connecting each pair of adjacent containers.

As mentioned above each container is connected with its associated containers through a rotating valve device 10', 10², 10³, 10⁴, 10⁵, and 10⁶, respectively. The valve device is of such construction that the raw material is moved from one container to its associated container. Any solution which is removed from that container together with the raw material is returned to that container by steam pressure, or gas pressure of indifferent gases as carbonic acid, nitrogen or air, whereby a sieve (Figs. 12 and 13) at the exit of the valve avoids the return of raw material. By changing the speed of the movement of the rotating valves it is possible to control the speed of the movement of the raw material in its passing through all containers and thereby the quality of the output. The rotation of all valves is achieved by any known means well known to men skilled in the art.

Figures 12, 13:
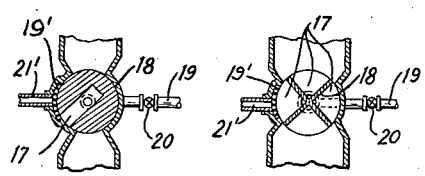
Figs. 12 and 13 show sectional views of two variations of another element of the apparatus.

It can be learned from Fig. 12 that the rotating valves 10', 10², 10³, 10⁴, and 10⁵ are constructed with a hollow chamber 17 and equipped with an axial boring 18 ending into that hollow chamber 17. The chamber 17 will be of larger volume in the arrangement of Fig. 2 in order to provide sufficient space for the hydrolysis process. A steam pipe 19 with a control valve 20 opened and closed preferably by a cam (not shown) is connected with the valve chamber 18 of preferably cylindrical shape. A pipe 21', 21², 21³, 21⁴, 21⁵, 21⁶, respectively, connects each valve chamber 18 with the same container from which the raw material and the liquid has been removed. An inner chamber 17 is arranged in the valve body and the pipe 19 enters the chamber 17 by an axially extending end piece of the pipe 19. The chamber 17 is so arranged that one end is open to the valve chamber 18. The valve 10' to 10⁶ rotate constantly and when the hollow chamber 17 is open to the upper container, raw material and liquid will enter. Upon continuous rotation of that valve counterclockwise the opening of the hollow chamber will mesh the pipes 21' to 21⁶, respectively, (Figs. 1 and 12). At the same moment the valves 20 are automatically opened and steam pressure introduced into the chamber 17. The pipes 21' to 21⁶ return thereupon the liquid to the same container from which it was introduced into the valve device. A sieve 19' (Fig. 12) in the chamber 18 prevents the escape of raw material into the pipe 21' to 21⁶, respectively. After removing the liquid from the hollow chamber 17 the raw material alone remains and upon further rotation of the valve that material will be delivered to the next lower container.

Whereas the valve construction as shown in Fig. 12 passes the raw material in an intermittent movement from one container to the next, Fig. 13 shows a valve construction according to which continuous movement of the raw material from one container to the next is achieved. This continuous movement is made possible by providing a plurality of chambers 17 of sector like cross-section (Fig. 13), the angle of each section being smaller than the open exit angle formed by the upper container. By this arrangement the material will flow simultaneously in two adjacent chambers 17 and upon continuous rotation of the valve the next chamber 17 will receive material already when the previous one is still receiving material thereby allowing continuous movement of the raw material.

The construction shown in Figs. 1 and 2 present one embodiment of the present invention.

Figure 3:
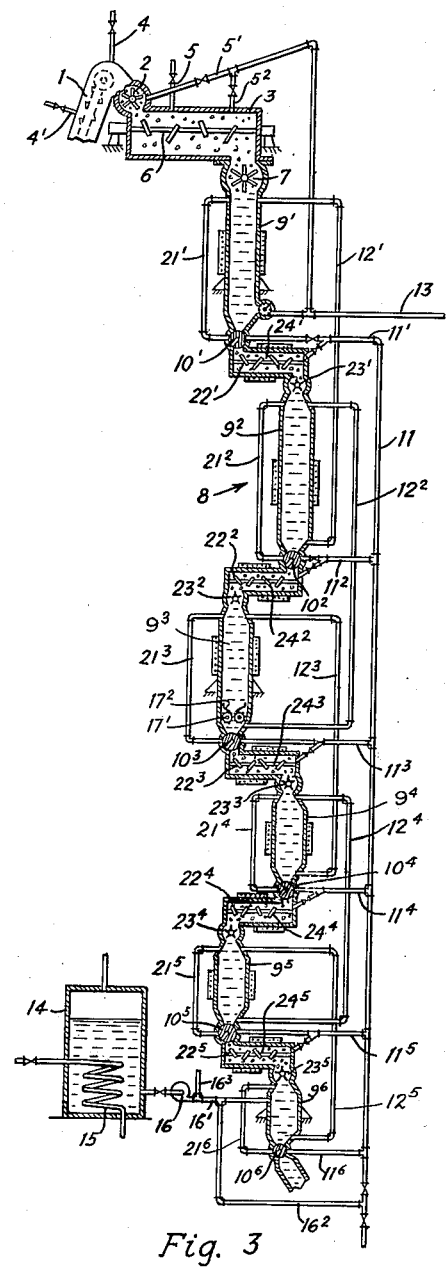
Fig. 3 shows a sectional view of another embodiment of the apparatus having the conduit as shown in Fig. 1.
Figure 4:
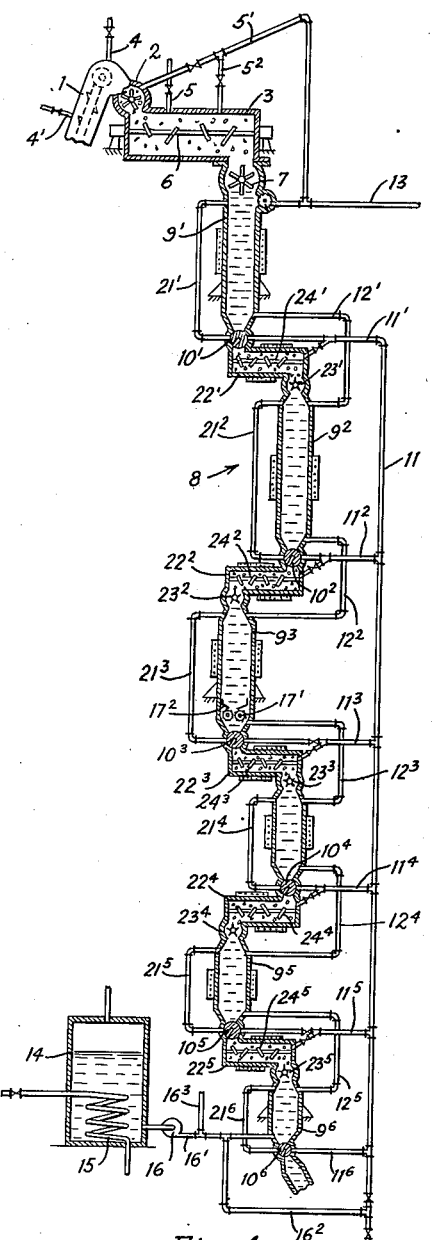
Fig. 4 shows a sectional view of the embodiment of the apparatus shown in Fig. 3 having the conduit as shown in Fig. 2.

The constructions shown in Figs. 3 and 4 are similar to those disclosed in Figs. 1 and 2, respectively, however, small containers 22', 22², 22³, 22⁴, and 22⁵ are provided between each pair of adjacent containers 9' to 9⁶ and the above mentioned valve devices 10' to 10⁶ arranged between the exits of the containers 9' to 9⁶ and the chambers 22' to 22⁵, respectively, and sluices 23' to 23⁵ between the containers 22' to 22⁵ and the entrance to the lower containers 9' to 9⁶. In the small containers 22' to 22⁵ the raw material is subject to steam treatment by means of branch pipes from the steam conduits 11' to 11⁷. Due to the horizontal arrangement of the containers 22' to 22⁵ a feeding device 24', 24², 24³, 24⁴, 24⁵, respectively, is provided in each one of said containers. The containers 9' to 9⁶ are in accordance with this construction entirely filled up with liquid, since the gas space has been transferred to the special containers 22' to 22⁵. Figs. 3 and 4 are mainly distinguished from each other by the same features as disclosed in connection with Figs. 1 and 2, respectively, namely that the liquid moves in Fig. 3 within the containers 9' to 9⁶ in the direction of the movement of the raw material and in Fig. 4 counter to the direction of the movement of the raw material.

Figure 5:
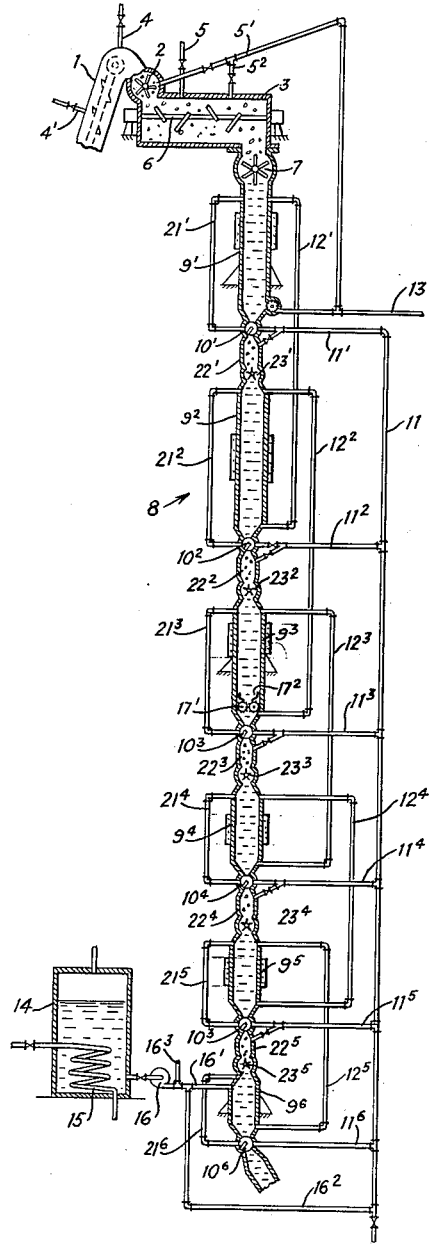
Figs. 5 and 6 show sectional views of a variation of the embodiment shown in Figs. 3 and 4, respectively.
Figure 6:
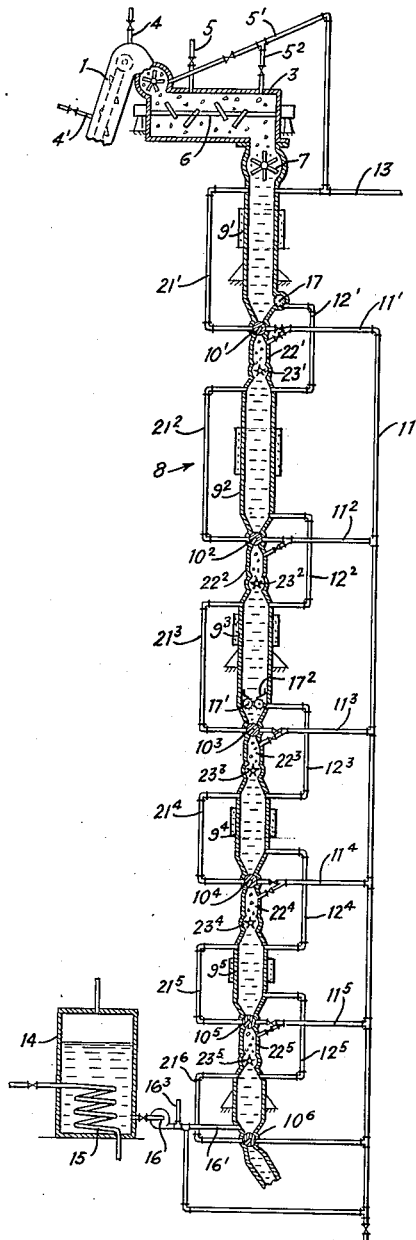

Figs. 5 and 6 show constructions which are principally exactly alike those shown in Figs. 3 and 4, respectively, and also comprise the same elements and particularly the same conduits. The only difference can be seen in the vertical arrangement of the small gas containers 22' to 22⁵ which arrangement eliminates the feeding device 24' to 24⁵.

Figure 7:
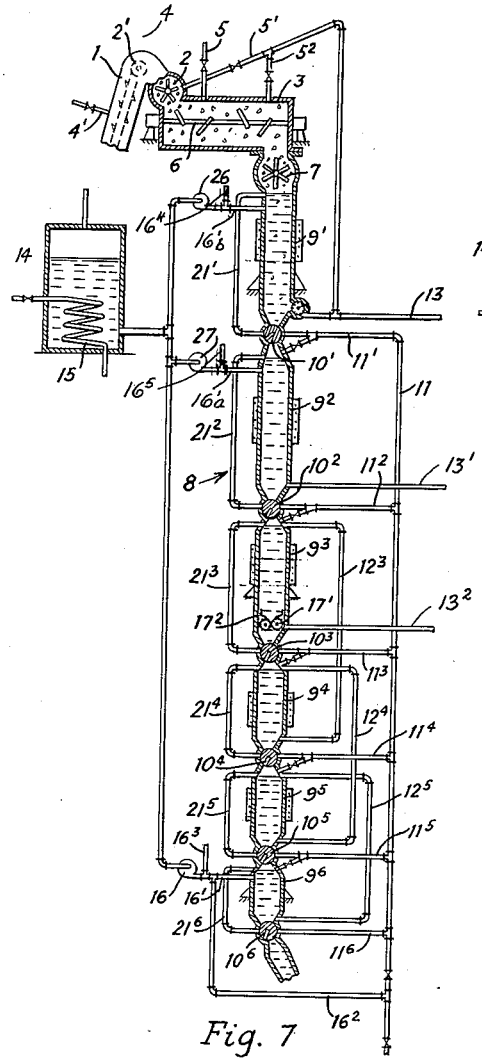
Figs. 7 and 8 show sectional views of a further variation of the embodiment shown in Figs. 1 and 2, respectively.
Figure 8:
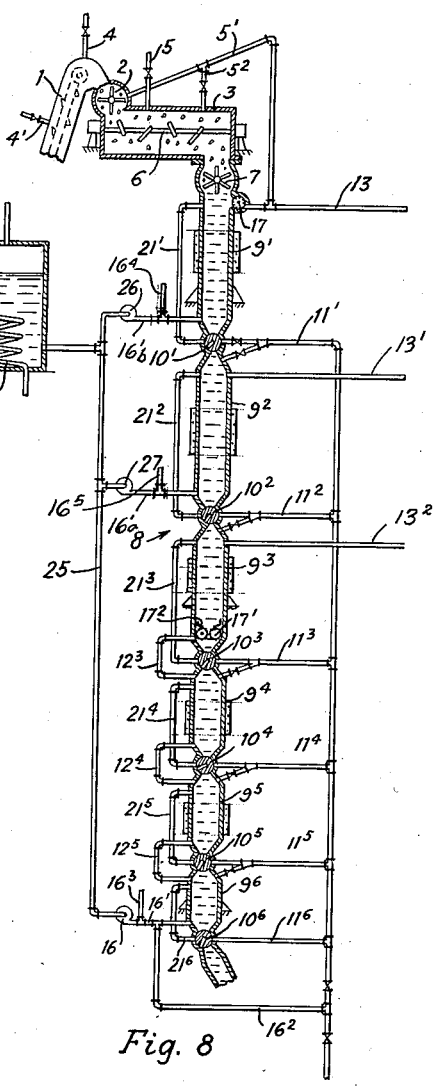

The constructions shown in Figs. 7 and 8 are basically also identical with those of Figs. 1 and 2, respectively. However, the constructions shown by example in Figs. 7 and 8 disclose an arrangement which by example gives three different qualities of the final extraction solution, though it is clear that any number of qualities can be achieved by proper similar arrangements. Besides the solution obtained from extraction of the material in the first container of the series with fresh extraction liquid, which solution is known as "first run," through pipe 13 the solution obtained from the second container in the series by extraction of the material moved from the first into the second container also with fresh extraction liquid, which solution is known as "second run," through pipe 13' a third solution is obtained from the next container in the series which has not been used for special solutions, that is here in the given example the third container in the series through pipe 13². The different solutions are achieved by providing a pipe 25 which delivers hot water through respective pumps 26, 27 and 16 directly into the first, second and last containers 9', 9² and 9⁶, respectively.

The constructions shown in Figs. 9 and 10 correspond with those shown in Figs. 5 and 6, respectively, and an additional arrangement for "first run" and "second run," exactly like that disclosed in connection with Figs. 7 and 8 has been provided.

Figure 11:
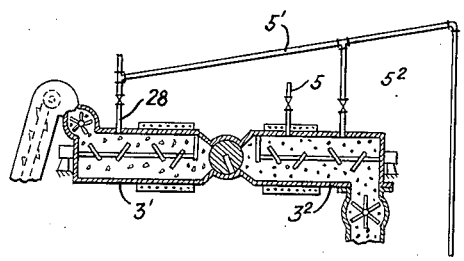
Fig. 11 shows a sectional view of a variation of an element of the apparatus.

Instead of arranging one small container 3 through which the raw material passes, as a variation, two such small containers can be provided in series, as the containers 3' and 3² in Fig. 11. One of the containers, preferably the second one will be provided with a steam pipe 5 whereas the first one is connected through a pipe 28 with vacuum in order to remove all the air contained in the raw material before the diffusion process starts. Instead of providing a steam pipe 5, it is also possible to provide a steam jacket (Fig. 1).

Figure 14:
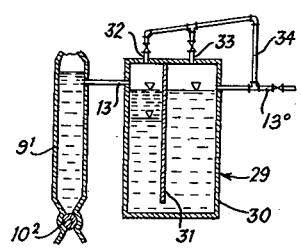
Fig. 14 shows a supplemental device to be used with the apparatus depending upon the raw material used in the process.

As stated before degreased or not degreased material can be used in the glue or gelatin manufacturing process. In the latter case the output will comprise a mixture of glue or gelatin solution and grease, the saponification of the latter being prevented by using an extraction liquid of proper predetermined pH characteristic. Although any conventional device for separating the grease from the glue or gelatin solution can be used, one device working on the basis of the difference of specific weight of grease and glue or gelatin solution is shown in Fig. 14. According to this arrangement the separating device 29 is set between the upper container 9' and the evaporator (not shown). The device 29 comprises a housing 30 which is connected with the upper container 9' by the pipe 13. A separating vertical wall 31 is provided which ends in some distance from the bottom of the housing 30 thereby maintaining communication between the two chambers into which the housing 30 is divided by the wall 31. The grease will be collected in the left chamber which grease due to the lighter specific weight will swim on the surface of the glue or gelatin solution and consequently the right chamber will contain glue or gelatin solution only which will be moved through the pipe 13' to an evaporator (not shown). The top of the housing 30 is equipped with a vacuum pipe 32 and 33 for each chamber. The pipes 32 and 33 are connected through a conduit 34 with the pipe 13' connecting the housing 29 with the evaporator (not shown).

It has been stated before that the speed of the rotating valves provide one means for controlling the quality of the output. Another means for the same purpose is the control of the liquid flow through the containers and a third means is provided for the control of the temperature to which the material to be treated is subjected, and a fourth means is provided by the conduit 16³, 16⁴ and 16⁵ connected with the liquid pipes 16', 16'ₐ and 16'ᵦ, respectively, thereby controlling the hydrogen-ion concentration (pH) of the liquid. Thus it is possible by analysis of the material which had been extracted to determine the desired requirements for achieving a predetermined yield. All four means can be controlled even during the operation of the process.

While I have disclosed several embodiments of the present invention, it is to be understood that these embodiments are given by example only and not in a limiting sense, the scope of the present invention being defined by the appended claims.

What I claim is:

1. An apparatus for extraction of solid material with solvent comprising a succession of extraction containers, a solvent inlet into at least the end container in the series and a solvent outlet from the first container in the series in the order of flow of solid material, feed means for said solid material into the first container and an outlet therefor from the end container, a valve structure disposed between each pair of adjacent containers, said valve structure comprising a rotatable compartment valve plug and conduits for steam and screened outlet for expressed solvent, the latter to be returned to the container preceding the respective valve structures, and a conduit between each pair of adjacent containers for feeding solvent from each container to its preceding container.

2. The apparatus, as set forth in claim 1, in which a chamber is disposed between each pair of adjacent containers and a conduit for steam leading into each of said chambers.

3. The apparatus, as set forth in claim 1, in which each container has a solvent outlet for the last mentioned conduit at a point adjacent the material inlet and a solvent inlet at a point adjacent the material outlet.

4. The apparatus, as set forth in claim 1, in which each container has a solvent outlet for the last mentioned conduit at a point adjacent the material outlet and a solvent inlet at a point adjacent inlet.

5. The apparatus, as set forth in claim 1, in which a solvent inlet is provided into at least the first container in the series in the order of flow of solid material for direct flow of solvent into said first container in addition to the direct flow into the end container.

CAMILLO J. MUELLER.

REFERENCES CITED

The following references are of record in the file of this patent:

UNITED STATES PATENTS

| Number | Name | Date |
| --- | --- | --- |
| 708,494 | Randall | Sept. 2, 1902 |
| 720,789 | Delattre | Sept. 17, 1903 |
| 1,474,062 | Bollman | Nov. 13, 1923 |
| 1,628,787 | Kennedy | May 17, 1927 |
| 2,154,339 | Lawrence | Apr. 11, 1939 |
| 2,156,236 | Bonotto | Apr. 25, 1939 |